United States Patent
Reial et al.

(10) Patent No.: US 12,207,113 B2
(45) Date of Patent: Jan. 21, 2025

(54) ADAPTIVE USER EQUIPMENT OPERATION MODE

(71) Applicant: Telefonaktiebolaget LM Ericsson (publ), Stockholm (SE)

(72) Inventors: Andres Reial, Malmö (SE); Sina Maleki, Malmö (SE); Gang Zou, Lund (SE); Ilmiawan Shubhi, Malmö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 401 days.

(21) Appl. No.: 17/764,801

(22) PCT Filed: Oct. 10, 2019

(86) PCT No.: PCT/EP2019/077488
§ 371 (c)(1),
(2) Date: Mar. 29, 2022

(87) PCT Pub. No.: WO2021/069077
PCT Pub. Date: Apr. 15, 2021

(65) Prior Publication Data
US 2022/0369137 A1    Nov. 17, 2022

(51) Int. Cl.
*H04W 24/04* (2009.01)
*H04W 24/08* (2009.01)
*H04W 52/04* (2009.01)

(52) U.S. Cl.
CPC ................. *H04W 24/08* (2013.01)

(58) Field of Classification Search
None
See application file for complete search history.

(56) References Cited

U.S. PATENT DOCUMENTS

| | | | |
|---|---|---|---|
| 10,306,584 B2 * | 5/2019 | Yiu | H04W 8/08 |
| 2001/0034254 A1 * | 10/2001 | Ranta | H04B 1/7115 455/574 |
| 2013/0210420 A1 * | 8/2013 | Deivasigamani | H04W 52/0251 455/423 |
| 2016/0187458 A1 * | 6/2016 | Shah | H04W 4/02 455/456.1 |

(Continued)

OTHER PUBLICATIONS

International Search Report and Written Opinion dated Jul. 3, 2020 for International Application No. PCT/EP2019/077488 filed Oct. 10, 2019, consisting of 9-pages.

*Primary Examiner* — Duc T Duong
(74) *Attorney, Agent, or Firm* — Weisberg I.P. Law, P.A.

(57) ABSTRACT

According to certain embodiments, a wireless device is configured to operate in a regular-power mode and a low-power mode, and a method of detecting wireless device movement includes: performing a link characterization measurement in the low-power mode using a low-power radio; determining, based on the low-power radio link characterization measurement, that the wireless device is not stationary; and performing radio resource measurements in the regular-power mode. In particular embodiments, performing the link characterization measurement using the low-power radio includes measuring a stationary reference signal (e.g., secondary synchronization signal (SSS)). Measuring the stationary reference signal uses a time-domain correlation receiver on the stationary reference signal.

16 Claims, 6 Drawing Sheets

(56) References Cited

U.S. PATENT DOCUMENTS

| | | | |
|---|---|---|---|
| 2016/0360438 A1* | 12/2016 | Yiu | H04W 64/00 |
| 2017/0280367 A1 | 9/2017 | Komati et al. | |
| 2017/0332424 A1* | 11/2017 | Salot | H04W 40/005 |
| 2018/0279143 A1* | 9/2018 | Bhattad | H04W 48/12 |
| 2019/0021017 A1* | 1/2019 | Nagaraja | H04W 72/51 |
| 2019/0045416 A1* | 2/2019 | Hwang | H04W 36/36 |
| 2019/0082392 A1 | 3/2019 | Balasubramanian et al. | |
| 2019/0174447 A1* | 6/2019 | Liu | H04W 76/28 |
| 2021/0045059 A1* | 2/2021 | Balasubramanian | G06F 1/3278 |
| 2022/0163614 A1* | 5/2022 | Wong | H04W 64/00 |
| 2022/0353722 A1* | 11/2022 | Koskela | H04B 7/0693 |

\* cited by examiner

ADAPTIVE USER EQUIPMENT OPERATION MODE

CROSS-REFERENCE TO RELATED APPLICATIONS

This application is a Submission Under 35 U.S.C. § 371 for U.S. National Stage Patent Application of International Application Number: PCT/EP2019/077488, filed Oct. 10, 2019 entitled "ADAPTIVE USER EQUIPMENT OPERATION MODE," the entirety of which is incorporated herein by reference.

TECHNICAL FIELD

Embodiments of the present disclosure are directed to wireless communications and, more particularly, to an adaptive user equipment (UE) operation mode.

BACKGROUND

For a stationary user equipment (UE) in a wireless communication network, radio resource measurement (RRM) results might be the same or similar over a relatively long period. Therefore, RRM measurement can be relaxed during the stationary period, i.e. allowing a UE to perform RRM measurement less frequently or even to skip a particular number of measurements. This reduces UE energy consumption for RRM measurements and increases UE battery life. On the other hand, when a stationary UE leaves a stationary state, i.e. transitions into a mobility state, the UE should scale up its RRM frequency to preserve RRM robustness.

In fifth generation (5G) new radio (NR), synchronizations signals are packed as a single block referred to as a synchronization signal block (SSB) or synchronization/physical broadcast channel (PBCH) block. Synchronization signals comprise a primary synchronization signal (PSS) and secondary synchronization signals (SSS). PBCH channel data contains PBCH demodulation reference signal (DMRS) and cell system information. A UE detects SSB to synchronize with the network and perform beam monitoring and neighbor/serving cell measurement.

An SSB signal may include the following properties. An SSB burst transmission may comprise a sweep of 4-64 SSB instances (2-4 ms). An SSB instance length is 4 symbols. The SSS length is one symbol (e.g., 36 us at 30 kHz sub-carrier spacing (SCS)). The configuration is fixed per cell. The bandwidth configuration is 12 physical resource blocks (PRBs), 127 sub-carriers (e.g., 3.8 MHz at 30 kHz SCS). A guard band includes 8 sub-carriers. An example is illustrated in FIG. 1.

Figure 1:
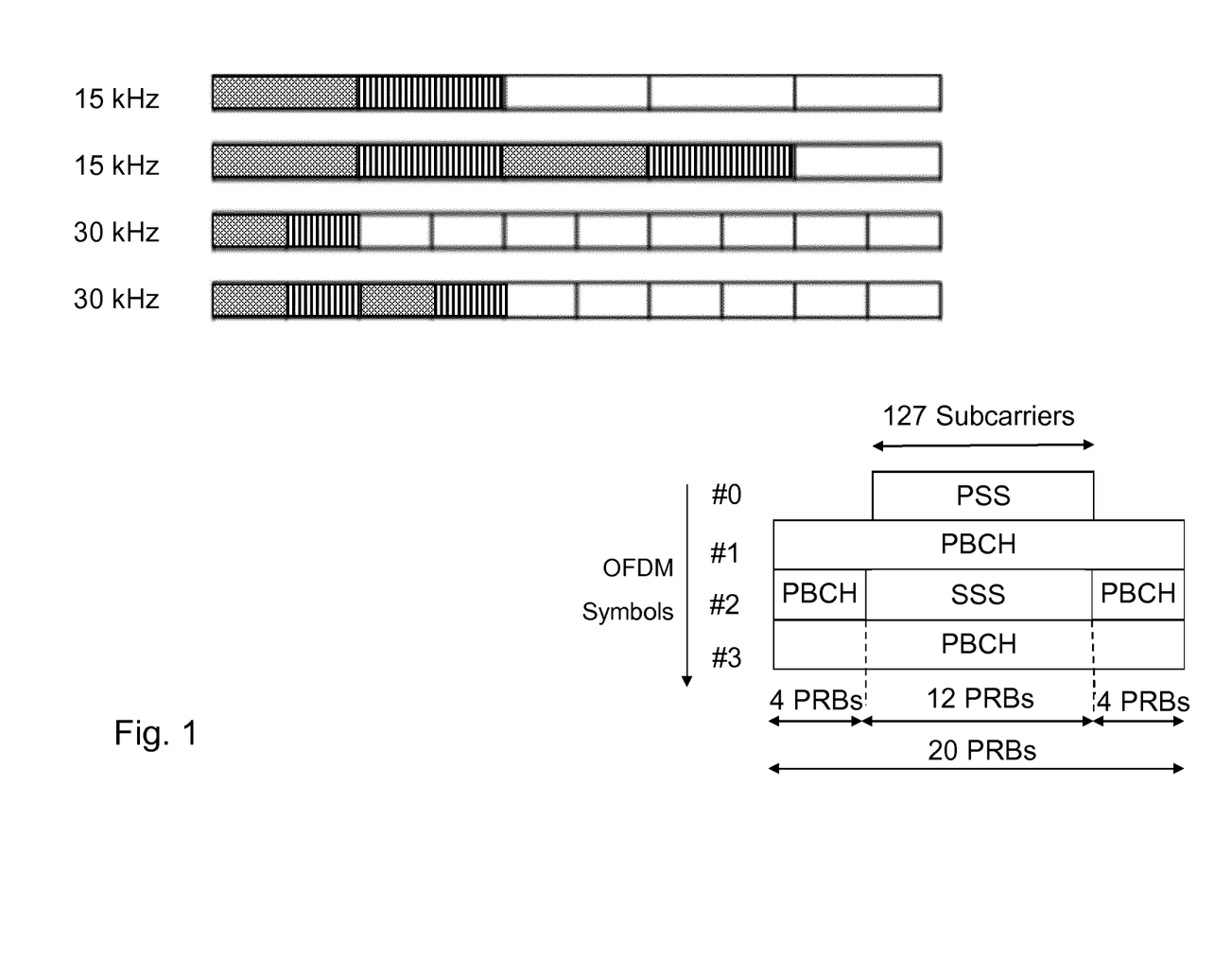
FIG. 1 is a block diagram illustrating an example synchronization signal block (SSB)

FIG. 1 is a block diagram illustrating an example synchronization signal block (SSB). The SSB comprises PSS, SSS and PBCH. An SSB consists of 240 subcarriers (20 PRBs) in the frequency domain, numbered from 0 to 239. In the time domain, an SSB consists of four orthogonal frequency division multiplexed (OFDM) symbols, numbered from 0 to 3. The center frequency of the PSS and SSS is the same as the center frequency of the PBCH.

PSS is transmitted in the first OFDM symbol. PSS occupies 127 subcarriers and the remaining subcarriers in the sides are empty. SSS is transmitted in the third OFDM symbol and it also occupies 127 subcarriers. Sides of the SSS have eight and nine empty subcarriers. PBCH is transmitted in the second, fourth and partially in the third OFDM symbol. PBCH occupies 240 subcarriers (20 PRBs) in the second and fourth symbol, and 48 subcarriers on each side of the SSS.

There currently exist certain challenges with RRM for stationary UEs. For example, In stationary mode (e.g., resting on a desk), to save energy, a UE may be permitted to perform RRM and beam measurements (BM) more infrequently because the environment is not changing. However, for robust operation, the UE should be able to rapidly detect when it starts moving and leave the stationary mode to resume regular measurements.

To save UE energy, it is desirable to obviate the need for regular radio operations at a rate that is sufficiently high for timely status change detection. Some solutions use UE internal sensors (gyroscopes and accelerometers) as a source of movement indication, to be used as a trigger to revert to the regular/mobile status. This solution, however, is limited to UEs that are, e.g. smartphones or certain wearables, but not feasible for a range of other lower cost UE designs that do not include expensive internal sensors. The power consumption of operating the internal sensors also may not be favorable in some cases. Furthermore, the sensors do not detect changes in the cellular environment, e.g. changes to active network nodes or interference background, that would normally trigger BM or RRM actions.

SUMMARY

Based on the description above, there currently exist certain challenges with radio resource measurement (RRM) for station user equipment (UEs). Particular embodiments described herein include rapid and reliable detection of a UE that is no longer stationary wherein the detection does not rely on using the main cellular radio or internal sensors.

In particular embodiments, a fifth generation (5G) new radio (NR) UE operates a time-domain correlation receiver on a secondary synchronization signal (SSS) in the synchronization signal block (SSB) whose result is used as input to a channel change detector. If the channel change detector observes a channel change, the UE in stationary status reconfigures itself for more frequent measurements.

In particular embodiments, the SSS receiver may be gated to the current best SSB in the cell or perform measurements on all SSBs in the burst. The criterion for movement detection may be e.g. a change exceeding a threshold in best SSB signal strength, or a change in relative strengths of multiple SSBs in the burst.

According to some embodiments, a wireless device is configured to operate in a regular-power mode and a low-power mode, and a method of detecting wireless device movement comprises: performing a link characterization measurement in the low-power mode using a low-power radio; determining, based on the low-power radio link characterization measurement, that the wireless device is not stationary; and performing radio resource measurements in the regular-power mode.

In particular embodiments, the method further comprises determining that the wireless device is stationary based on a radio resource measurement performed in regular-power mode and transitioning the wireless device to low power mode.

In particular embodiments, performing the link characterization measurement using the low-power radio comprises measuring a stationary reference signal. Measuring the stationary reference signal comprises measuring the stationary reference signal using a time-domain correlation receiver on the stationary reference signal. Measuring the stationary reference signal further comprises using a primary synchronization signal (PSS) for time/frequency synchronization and performing a sliding time-domain correlation.

In particular embodiments, determining that the wireless device is not stationary comprises determining that the link characterization measurement of the stationary reference signal is different than a previous link characterization measurement for the stationary reference signal. Determining that the wireless device is not stationary may comprise determining that the link characterization measurement of the stationary reference signal is different with respect to a link characterization measurement of another stationary reference signal.

In particular embodiments, the link characterization measurement of the stationary reference signal comprises at least one of a signal strength measurement, a signal quality measurement, and an angle of arrival measurement. The link characterization measurement of the stationary reference signal may comprise a combined link characterization measurement of more than one stationary reference signal.

In particular embodiments, the stationary reference signal comprises at least one of an SSS and a CSI-RS.

In particular embodiments, the wireless device uses the same radio circuitry when operating in low-power mode as when operating in regular-power mode, and the radio circuitry is configurable to operate as the low-power radio when the wireless device is operating in low-power mode.

According to some embodiments, a wireless device is operable to detect wireless device movement. The wireless device is configured to operate in a regular-power mode and a low-power mode. The wireless device comprises processing circuitry operable to perform any of the wireless device methods described above.

Also disclosed is a computer program product comprising a non-transitory computer readable medium storing computer readable program code, the computer readable program code operable, when executed by processing circuitry to perform any of the methods performed by the wireless device described above.

Certain embodiments may provide one or more of the following technical advantages. For example, particular embodiments enable a UE to reliably save energy by operating in relaxed measurement mode while stationary, by power-efficiently detecting when the UE is no longer stationary without relying on the main cellular radio or internal sensors.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, there currently exist certain challenges with radio resource measurement (RRM) for station user equipment (UEs). Particular embodiments described herein include rapid and reliable detection of a UE that is no longer stationary wherein the detection does not rely on using the main cellular radio or internal sensors.

In particular embodiments, a fifth generation (5G) new radio (NR) UE operates a time-domain correlation receiver on a secondary synchronization signal (SSS) in the synchronization signal block (SSB), for example, whose result is used as input to a channel change detector. If the channel change detector observes a channel change, the UE in stationary status reconfigures itself for more frequent measurements.

In particular embodiments, the SSS receiver may be gated to the current best SSB (e.g., highest signal quality) in the cell or perform measurements on all SSBs in the burst. The criterion for movement detection may be e.g. a change exceeding a threshold in best SSB signal strength, or a change in relative strengths of multiple SSBs in the burst.

Particular embodiments enable a UE to reliably save energy by operating in relaxed measurement mode (i.e., low-power mode) while stationary, by power-efficiently detecting when the UE is no longer stationary without relying on the main cellular radio or internal sensors.

Particular embodiments are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Particular embodiments facilitate a stationary UE, entitled to relaxed measurement procedures, to continue operating at that mode with minimum energy consumption. In particular, it is desirable to not have to invoke the main cellular receiver for intermediate measurements to determine whether the UE remains in the same mobility situation and movement state (i.e., not moving).

A UE, according to particular embodiments, achieves this by operating a low-power time-domain correlation receiver on the SSS in SSB whose output is used by a channel change detector. If a channel change is observed, the UE in stationary status may reconfigure itself for more frequent measurements (i.e., moving status).

In some embodiments, the full radio may still perform nominal relaxed measurements at a rather low rate, but the low-power radio performs more frequent monitoring. The UE does not need to wait for the next full measurement to detect a possible end of stationary status.

Particular embodiments benefit from the ability to verify the stationary status of the UE without the UE performing high-fidelity, full-power measurements, but can rely on previous such measurement results as long as it is able to ascertain that the situation remains static (unchanged). The latter can be done using a simple, lower-power radio that dispenses fast Fourier transform (FFT) and related processing and only collects samples for a time-domain correlator. The low-power measurements may be referred to as link characterization measurements. An example is illustrated in FIG. 2.

Figure 2:
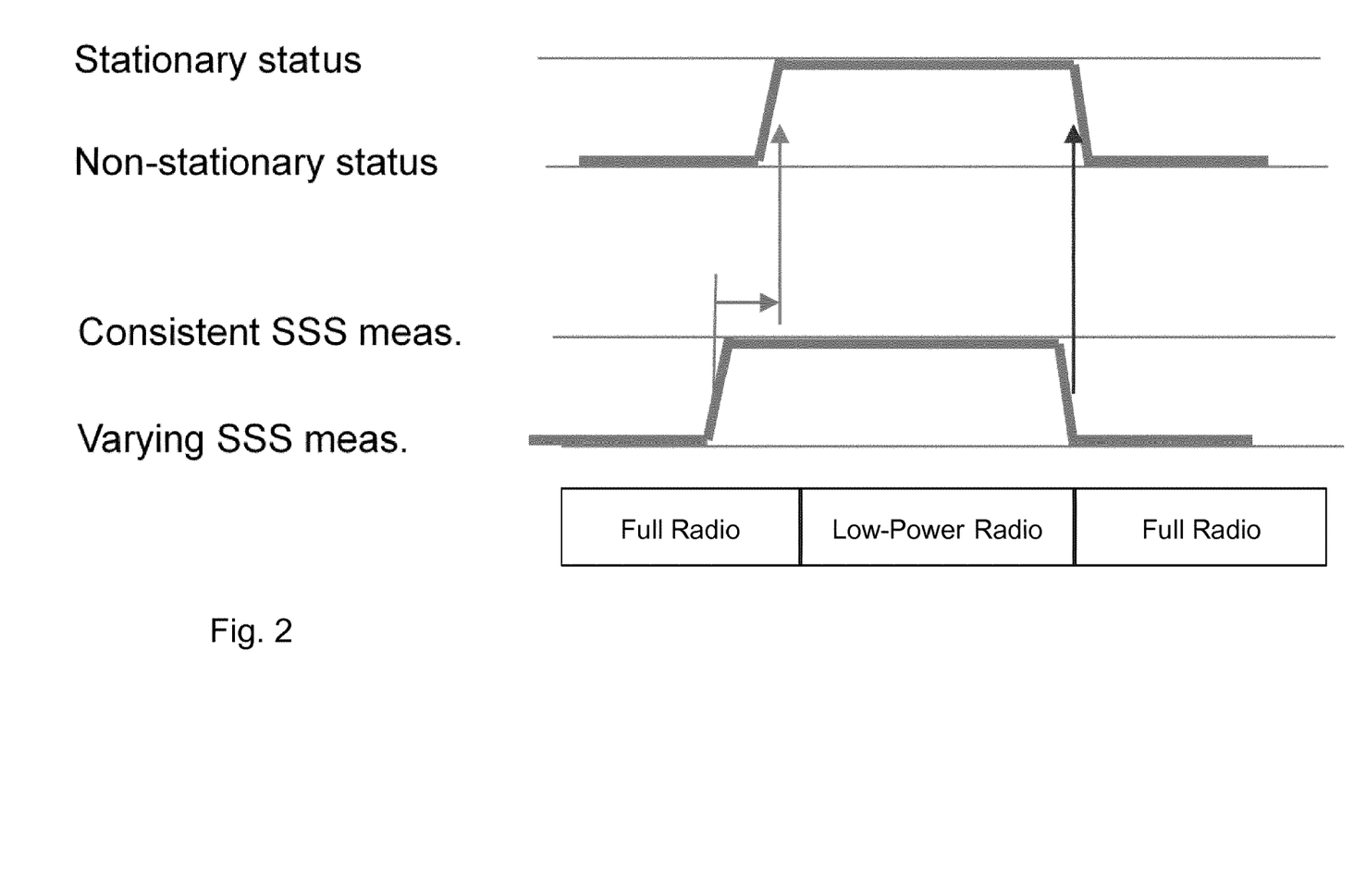
FIG. 2 is a timing diagram illustrating transition from a regular-power mode to a low-power mode, according to some embodiments.

FIG. 2 is a timing diagram illustrating transition from a regular-power mode to a low-power mode, according to some embodiments. The upper portion of FIG. 2 illustrates the positions in time when a UE transitions from a non-stationary status to a stationary status and back to a non-stationary status. The lower portion of FIG. 2 illustrates the positions in time, relative to the stationary/non-stationary status of the UE illustrated in the upper portion, where SSS measurements are varying (for a non-stationary UE) and where SSS measurements are consistent (for a stationary UE). When the UE is using the full radio, the UE may be referred to as operating in regular-power mode, and when the UE is using the low-power radio, the UE may be referred as operating in low-power mode. The UE is operable to adapt is operating mode based on its stationary status.

In some embodiments, a UE in a stationary status, configured to perform relaxed measurements, operates a low-power radio (LPR) for SSB sample collection. The LPR may comprise a separate hardware block or may comprise a low-power operating configuration of the cellular radio receiver, which may use the SSS component of the SSB for cell quality estimation. The low-power SSS receiver (i.e., LPR) may measure the current best SSB (e.g., highest signal quality) in the cell or perform measurements on several or all SSBs in the burst in the cell. The measurement may be referred to as a link characterization measurement.

In particular embodiments, a UE may use time-domain sample correlation for SSS power/quality measurements. The SSS sequence and frequency location is available from previous detection, whereby a time-domain reference sequence may be formed and used for correlation. The correlation magnitude output may be used as a provisional reference signal received power (RSRP) estimate. In some embodiments, in highly dispersive environments and/or at high subcarrier spacing (SCS), the correlation may be performed separately with respect to multiple SSS subband reference sequences and the estimated power metrics may be added/averaged or otherwise combined.

In particular embodiments, to further lower the operating power of the LPR, e.g. by dispensing with accurate local oscillator based hardware, the LPR may use the primary synchronization signal (PSS) in the SSB for time/frequency synchronization, performing sliding time-domain correlation with respect to the time-domain sequence representing the PSS. In some embodiments, time/frequency synchronization can also be accomplished by time-domain correlation over cyclic prefix (CP) of SSB.

In particular embodiments, the UE may perform occasional or periodic measurements during stationary status using the full cellular radio, e.g. to verify the LPR results or to obtain more accurate measurement results. Those measurements are preferably infrequent and are not essential for the purposes of the invention.

According to particular embodiments, the UE uses the low-power radio measurements to detect changes in the SSS characteristics to infer change in the stationary status, e.g. because of vehicular movement of the UE, etc. The criterion for movement detection may be, e.g. a change exceeding a threshold in the best SSB signal strength or a change in relative strengths of multiple SSBs in the burst.

In other embodiments, the UE may observe several SSS measurement results from LPR. The criterion for movement detection may be that all or most of the results exceed the threshold. Another example of change detection is to use detection of change in statistics. In one realization of statistical change detection, the ratio of output of the correlator or FFT over different samples is considered as the test, in case the ratio is over a specific threshold, the LPR declare a statistic change, and thus a change in the channel conditions. In one example, the network can use Student T-Test techniques for change detection.

In some embodiments, if the UE detects that it no longer has stationary status, it exits the relaxed measurement mode (i.e., low-power mode) and revert to non-relaxed measurements (i.e., regular-power mode). In some embodiments, this may include performing measurements at a more frequent rate on serving (camping) and possibly neighbor cells using the main cellular radio.

In some embodiments, the LPR may be used to estimate an angle of arrival (AoA) of a specific SSB or SSBs. AoA estimation can be implemented using different techniques, e.g., phase difference of different antennas, ratio of received signal strength indicator (RSSI), and so on. If the AoA changes more than a specific amount, then the UE can move to the non-relaxed measurement mode.

Another aspect accounted for by particular embodiments, particularly in choosing the appropriate change detector (correlation change, Student T-Test, AoA change, Doppler shift change, etc.) as well as the underlying receiver structure, is the detection performance characteristics defined by false alarm rate as well as detection probabilities. A false alarm leads to a move to non-relaxed measurement which in turn leads to additional power consumption. A mis-detection, however, means remaining in the relaxed mode, and thus losing the updated channel measurements, which in turn may lead to missed paging messages, physical downlink control channels (PDCCHs), and so on.

In the examples described above, the UE measures an SSS in low-power mode to detect UE movement. Particular embodiments, however, may use any suitable reference signal for the link characterization measurements. A suitable reference signal may refer to any reference signal that is stable over some predetermined time frame. The predetermined time frame is long enough so that the UE can perform reliable and recurring link quality checks with the low-power radio. The length may vary depending on the type of UE. Another example of a suitable reference signal is a CSI-RS that is not UE-specific. In general, a reference signal that is not UE-specific or that does not change precoding may be suitable reference signal. The reference signal may be cell-specific or non-cell specific. The reference signals may be referred to collectively as stationary reference signals. Thus, a stationary reference signal may refer to an SSS, a non UE-specific CSI-RS, or any other suitable reference signal.

In choosing the appropriate detector, the UE can make a trade-off between the detector power consumption, false alarm rate as well as miss detection rate, to choose the right detector. In some embodiments, the UE may choose the change detector with the lower mis-detection rate if the false alarm rate and LP detector power consumption is comparable. In choosing the minimum detection performance constraints, the UE may ensure that the specifications mandated by standards and regulations, e.g., PDCCH block error rate (BLER) is satisfied.

Some embodiments may be used to detect channel (or beam) blockage for a UE.

Figure 3:
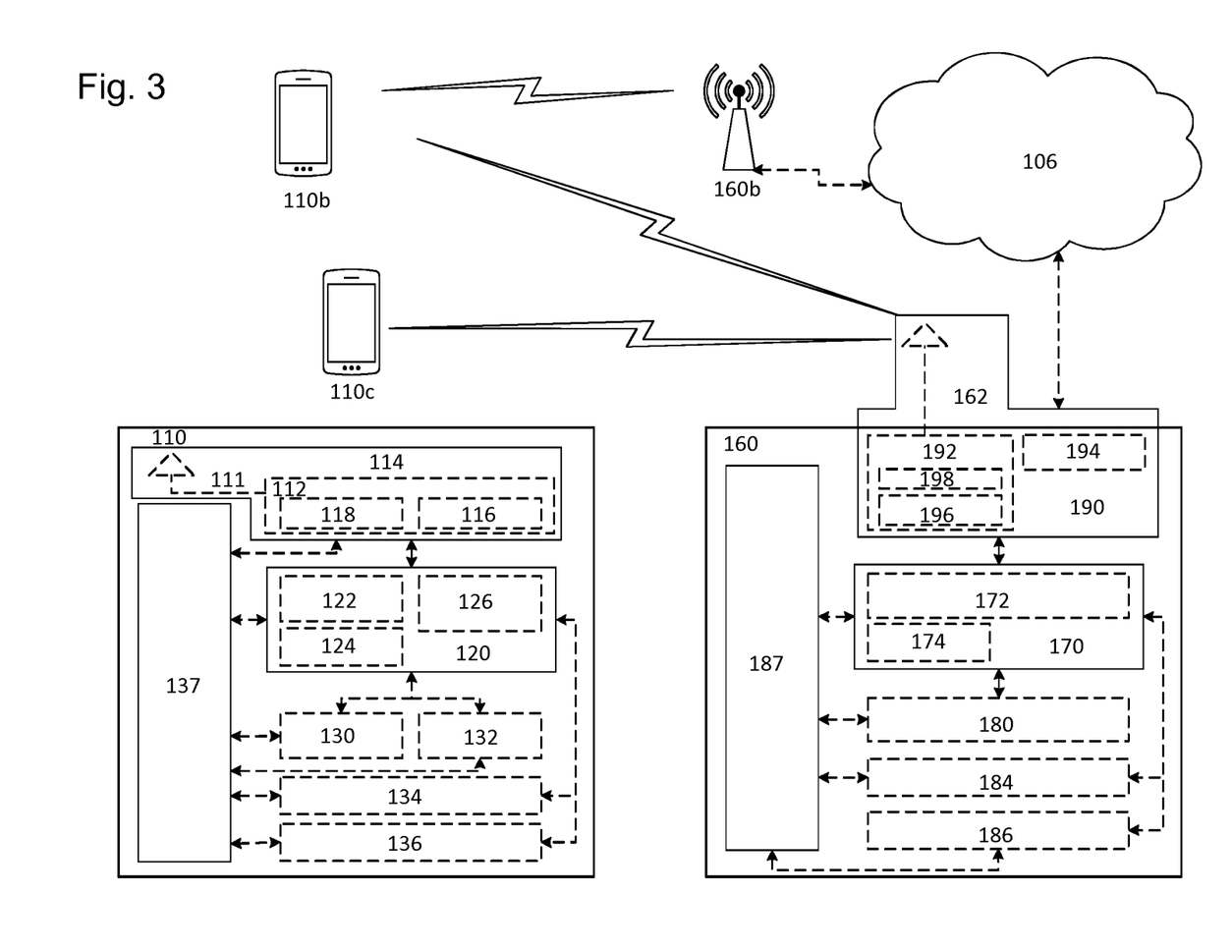
FIG. 3 is a block diagram illustrating an example wireless network.

FIG. 3 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 160 includes processing circuitry 170, device readable medium 180, interface 190, auxiliary equipment 184, power source 186, power circuitry 187, and antenna 162. Although network node 160 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and an RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Figure 4:
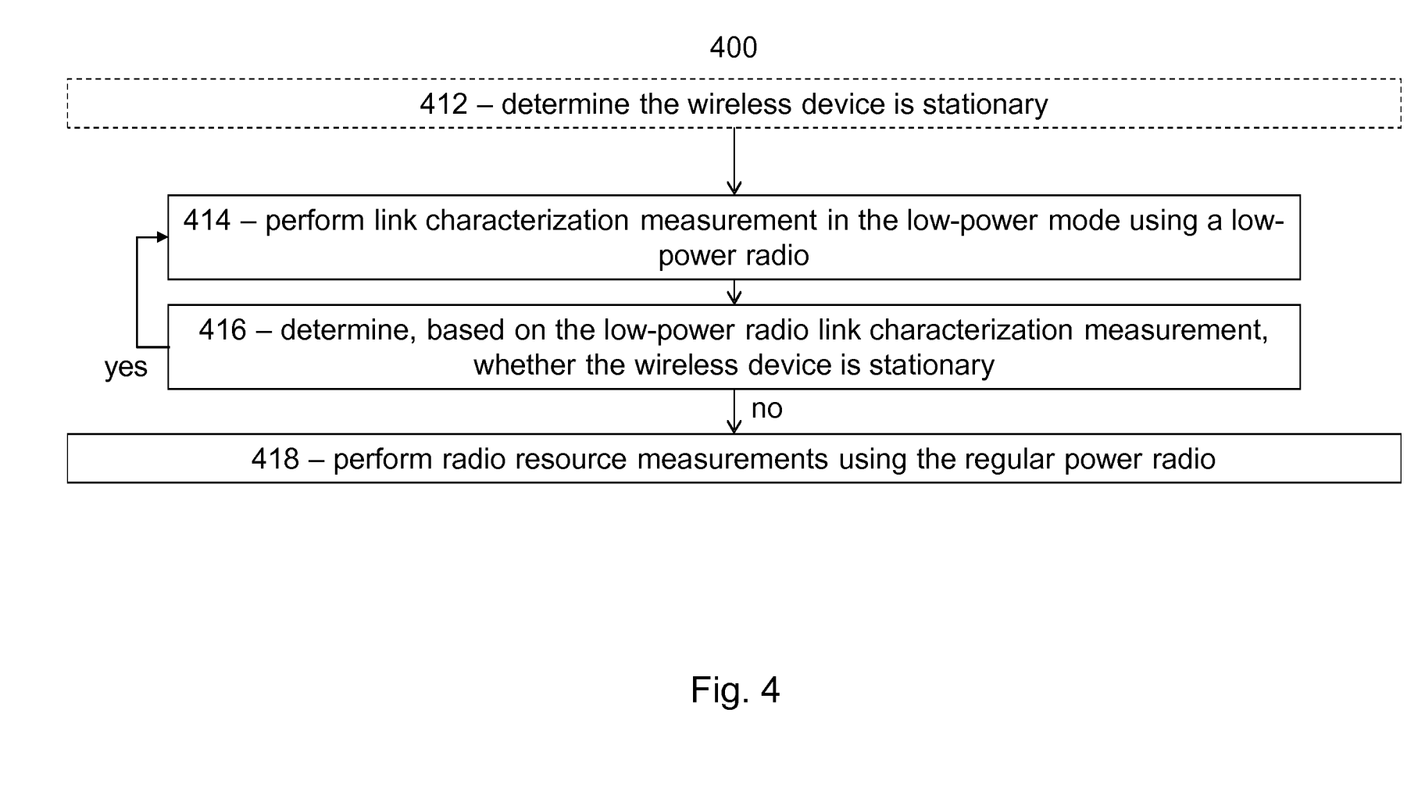
FIG. 4 is a flowchart illustrating an example method in a wireless device, according to certain embodiments.

Processing circuitry 170 is configured to perform any determining, calculating, or similar operations (e.g., certain obtaining operations) described herein as being provided by a network node, such as the scheduling operations described herein and with respect of FIGS. 2-4. The operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 3 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation.

A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

In some embodiments, WD 110 may include regular-power radio front end circuitry and/or antenna 111 and low-power radio front end circuitry and/or antenna 111. In some embodiments, the same radio circuitry may be configurable to operate as a low-power radio or a regular-power radio as needed over time.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g. RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and (WD 110 are depicted with additional detail. The wireless network may provide communication and other types of services to one or more wireless devices to facilitate the wireless devices' access to and/or use of the services provided by, or via, the wireless network.

The communication system 106 may itself be connected to a host computer (not shown), which may be embodied in the hardware and/or software of a standalone server, a cloud-implemented server, a distributed server or as processing resources in a server farm. The host computer may be under the ownership or control of a service provider or may be operated by the service provider or on behalf of the service provider.

The communication system of FIG. 3 as a whole enables connectivity between one of the connected WDs 110 and the host computer. The connectivity may be described as an over-the-top (OTT) connection. The host computer and the connected WDs 110 are configured to communicate data and/or signaling via the OTT connection, using an access network, a core network, any intermediate network and possible further infrastructure (not shown) as intermediaries. The OTT connection may be transparent in the sense that at least some of the participating communication devices through which the OTT connection passes are unaware of routing of uplink and downlink communications.

The host computer may provide host applications which may be operable to provide a service to a remote user, such as a WD 110 connecting via an OTT connection terminating at the WD 110 and the host computer. In providing the service to the remote user, the host application may provide user data which is transmitted using the OTT connection. The "user data" may be data and information described herein as implementing the described functionality. In one embodiment, the host computer may be configured for providing control and functionality to a service provider and may be operated by the service provider or on behalf of the service provider. The host computer may be enabled to observe, monitor, control, transmit to and/or receive from the network node 160 and or the WD 110.

One or more of the various embodiments in this disclosure improve the performance of OTT services provided to the WD 110 using the OTT connection. More precisely, the teachings of some of these embodiments may improve the data rate, latency, and/or power consumption and thereby provide benefits such as reduced user waiting time, relaxed restriction on file size, better responsiveness, extended battery lifetime, etc.

FIG. 4 is a flowchart illustrating an example method 400 in a wireless device, according to certain embodiments. In particular embodiments, one or more steps of FIG. 4 may be performed by wireless device 110 described with respect to FIG. 3. The wireless device is configured to operate in a regular-power mode and a low-power mode and is operable to detect wireless device movement.

The method may begin at step 412 where a wireless device (e.g., wireless device 110) determines that the wireless device is stationary. The determination may be based on a radio resource measurement performed in regular-power mode and transitioning the wireless device to low power mode (as illustrated in FIG. 2).

At step 414, the wireless device performs a link characterization measurement in the low-power mode using a low-power radio. For example, wireless device 110 may use the low-power radio to measure a stationary reference signal, such as a cell-specific or multiple-cell specific reference signal. In some embodiments, the stationary reference signal comprises at least one of an SSS and a CSI-RS.

In some embodiments, measuring the stationary reference signal comprises measuring the stationary reference signal using a time-domain correlation receiver on the stationary reference signal. Measuring the stationary reference signal may further comprise using a primary synchronization signal (PSS) for time/frequency synchronization and performing a sliding time-domain correlation.

In some embodiments, the link characterization measurement of the stationary reference signal comprises at least one of a signal strength measurement, a signal quality measurement, and an angle of arrival measurement. The link characterization measurement may comprise a combined link characterization measurement of more than one stationary reference signal. In some embodiments, the link characterization measurement (e.g., measuring the stationary reference signal) is performed according to any of the embodiments and/or examples described above with respect to FIG. 2.

At step 416, the wireless device determines, based on the low-power radio link characterization measurement, whether the wireless device is stationary. For example, determining that the wireless device is not stationary may comprise determining that the link characterization measurement of the stationary reference signal is different than a previous link characterization measurement for the stationary reference signal (e.g., difference between prior measurement and current, difference between average of multiple prior measurements and current, etc.) and/or that the link characterization measurement of the stationary reference signal is different with respect to a link characterization measurement of another stationary reference signal (e.g., a difference between a link characterization of two or more stationary reference signals has changed).

In some embodiments, the link characterization measurement of the stationary reference signal comprises a combined link characterization measurement of more than one stationary reference signal (e.g., averaging, smoothing, interpolating, etc. of multiple reference signals).

If the wireless device determines that it is stationary, then the method repeats steps 414 and 416 at some interval until the wireless device determines that it is not stationary. When the wireless device is not stationary, the method continues to step 418, where the wireless device performs radio resource measurements in the regular-power mode.

Modifications, additions, or omissions may be made to method 400 of FIG. 4. Additionally, one or more steps in the method of FIG. 4 may be performed in parallel or in any suitable order.

Figure 5:
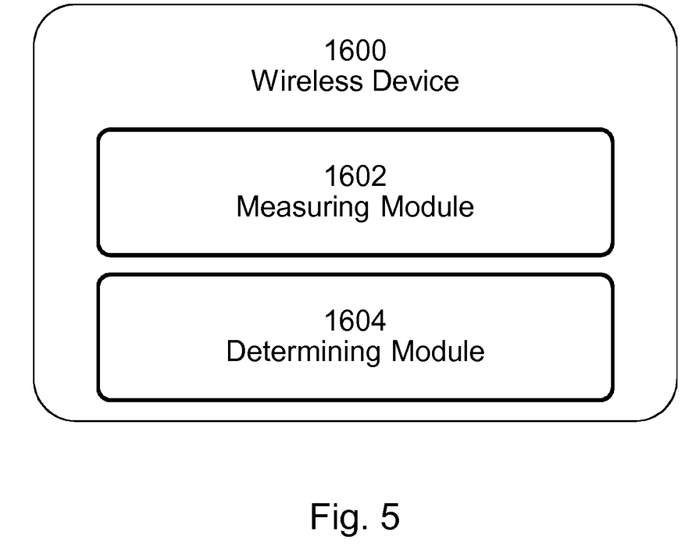
FIG. 5 illustrates an example wireless device, according to certain embodiments.

FIG. 5 illustrates an example wireless device, according to certain embodiments. The wireless device 1600 may comprise wireless device 110 illustrated in FIG. 3.

Wireless device 1600 is operable to carry out the example method described with reference to FIG. 4 and possibly any other processes or methods disclosed herein. It is also to be understood that the method of FIG. 4 is not necessarily carried out solely by apparatus 1600. At least some operations of the method can be performed by one or more other entities, including virtual apparatuses.

Wireless device 1600 may comprise processing circuitry such as processing circuitry 120 of FIG. 3. In some implementations, the processing circuitry may be used to cause measuring module 1602, determining module 1604, and any other suitable units of wireless device 1600 to perform corresponding functions according one or more embodiments of the present disclosure.

As illustrated in FIG. 5, wireless device 1600 includes measuring module 1602, and determining module 1604. In certain embodiments, measuring module 1602 may perform low-power link characterization measurements on stationary reference signals or regular-power radio resource measurements according to any of the embodiments and examples described herein. For example, for a wireless device operating in a regular-power mode, measuring module 1602 may perform radio resource measurements according to a particular schedule (i.e., frequency in time). Upon detecting the wireless device is stationary, the wireless device may transition to a low-power mode and measuring module 1602 may perform link characterization measurements on stationary reference signals according to a particular schedule. The particular schedule may differ from the schedule used in the regular-power mode. In some embodiments, the measuring module 1602 may continue to perform regular-power radio resource measurements in low-power mode, but a reduced frequency than in regular-power mode. Determining module 1604 may determine whether the wireless device is stationary based on the link characterization measurements and/or radio resource measurements, according to any of the embodiments and examples described herein.

Figure 6:
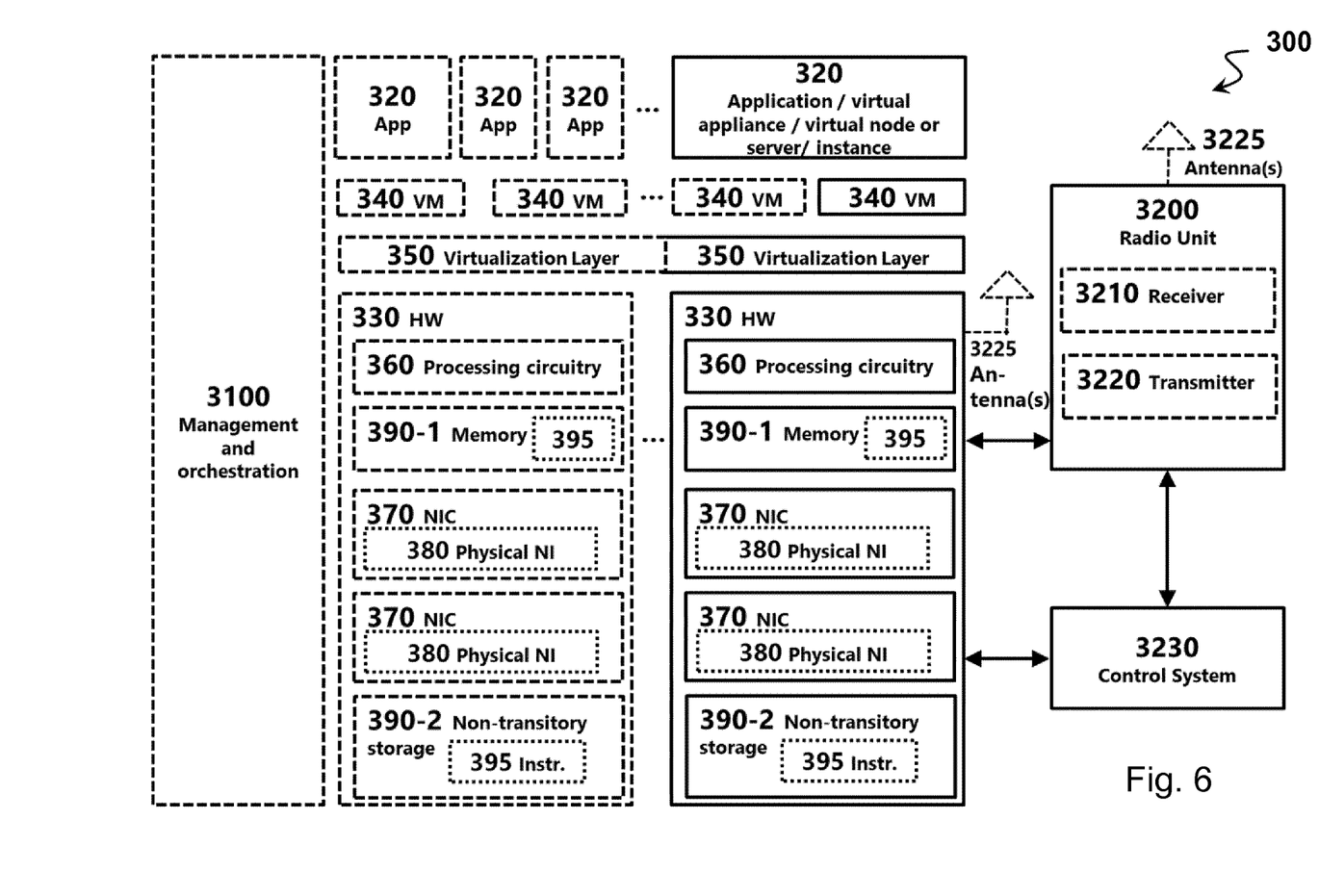
FIG. 6 illustrates an example virtualization environment, according to certain embodiments.

FIG. 6 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein, such as the method of FIG. 4, may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 6, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 6.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

The invention claimed is:

1. A method of adapting a wireless device operation mode, the wireless device configured to operate in a regular-power mode and a low-power mode, the method comprising:
    performing a link characterization measurement in the low-power mode using a low-power radio;
    determining, based on the low-power radio link characterization measurement, that the wireless device is not stationary; and
    performing radio resource measurements in the regular-power mode, performing the link characterization measurement using the low-power radio comprising measuring a stationary reference signal, measuring the stationary reference signal comprising:
        measuring the stationary reference signal using a time-domain correlation receiver on the stationary reference signal;
        using a primary synchronization signal for time/frequency synchronization; and
        performing a sliding time-domain correlation.

2. The method of claim 1, further comprising determining that the wireless device is stationary based on a radio resource measurement performed in regular-power mode and transitioning the wireless device to low power mode.

3. The method of claim 1, wherein determining that the wireless device is not stationary comprises determining that the link characterization measurement of the stationary reference signal is different than a previous link characterization measurement for the stationary reference signal.

4. The method of claim 1, wherein determining that the wireless device is not stationary comprises determining that the link characterization measurement of a first stationary reference signal is different with respect to a link characterization measurement of a second stationary reference signal.

5. The method of claim 3, wherein the link characterization measurement of the stationary reference signal comprises at least one of a signal strength measurement, a signal quality measurement, and an angle of arrival measurement.

6. The method of claim 1, wherein the link characterization measurement of the stationary reference signal comprises a combined link characterization measurement of more than one stationary reference signal.

7. The method of claim 1, wherein the stationary reference signal comprises at least one of a secondary synchronization signal and a channel state information reference signal.

8. The method of claim 1, wherein the wireless device comprises a regular radio circuitry, when a low-power radio is used, the regular radio is configured to be a low-power radio circuitry.

9. The method of claim 1, wherein the wireless device uses the same radio circuitry when operating in low-power mode as when operating in regular-power mode, and the radio circuitry is configurable to operate as the low-power radio when the wireless device is operating in low-power mode.

10. A wireless device configured to adapt its operation mode, the wireless device configured to operate in a regular-power mode and a low-power mode, the wireless device comprising processing circuitry configured to:
    perform a link characterization measurement in the low-power mode using a low-power radio;
    determine, based on the low-power radio link characterization measurement, that the wireless device is not stationary; and
    perform radio resource measurements in the regular-power mode, the processing circuitry being configured to perform the link characterization measurement using the low-power radio by measuring a stationary reference signal, measuring the stationary reference signal comprising:
        measuring the stationary reference signal using a time-domain correlation receiver on the stationary reference signal;

using a primary synchronization signal for time/frequency synchronization; and performing a sliding time-domain correlation.

11. The wireless device of claim 10, the processing circuitry further configured to determine that the wireless device is stationary based on a radio resource measurement performed in regular-power mode and transition the wireless device to low power mode.

12. The wireless device of claim 10, wherein the processing circuitry is configured to determine that the wireless device is not stationary by determining that the link characterization measurement of the stationary reference signal is different than a previous link characterization measurement for the stationary reference signal.

13. The wireless device of claim 10, wherein the processing circuitry is configured to determine that the wireless device is not stationary by determining that the link characterization measurement of the stationary reference signal is different with respect to a link characterization measurement of another stationary reference signal.

14. The wireless device of claim 10, wherein the measurement of the stationary reference signal comprises at least one of a signal strength measurement, a signal quality measurement, and an angle of arrival measurement.

15. The wireless device of claim 10, wherein the link characterization measurement of the stationary reference signal comprises a combined link characterization measurement of more than one stationary reference signal.

16. The wireless device of claim 10, wherein the stationary reference signal comprises at least one of a secondary synchronization signal and a channel state information reference signal.

* * * * *